US010530817B2

(12) United States Patent
Jeon et al.

(10) Patent No.: US 10,530,817 B2
(45) Date of Patent: Jan. 7, 2020

(54) METHOD FOR COMMUNICATION USING PLURALITY OF PROTOCOLS AND ELECTRONIC DEVICE THEREOF

(71) Applicant: Samsung Electronics Co., Ltd., Gyeonggi-do (KR)

(72) Inventors: Jae-Woong Jeon, Gyeonggi-do (KR); Dong-Hun Park, Gyeonggi-do (KR); Jung-Sik Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/866,689

(22) Filed: Jan. 10, 2018

(65) Prior Publication Data

US 2018/0205764 A1 Jul. 19, 2018

(30) Foreign Application Priority Data

Jan. 16, 2017 (KR) .................. 10-2017-0006928

(51) Int. Cl.
*H04L 29/06* (2006.01)
*H04L 29/08* (2006.01)
(Continued)

(52) U.S. Cl.
CPC .... *H04L 65/1003* (2013.01); *H04L 29/08954* (2013.01); *H04L 41/0226* (2013.01);
(Continued)

(58) Field of Classification Search
CPC ........... H04L 65/1003; H04L 29/08954; H04L 41/0226; H04L 41/0816; H04L 69/18; H04W 48/18; H04W 72/10; H04W 88/10
See application file for complete search history.

(56) References Cited

U.S. PATENT DOCUMENTS

2004/0077341 A1* 4/2004 Chandranmenon ..... H04M 3/00
2007/0275675 A1 11/2007 Darabi et al.
(Continued)

FOREIGN PATENT DOCUMENTS

| EP | 2 903 387 A1 | 8/2015 |
| WO | 2013/188209 A1 | 8/2013 |
| WO | 2016/124153 A1 | 8/2016 |

OTHER PUBLICATIONS

European Search Report dated Apr. 24, 2018.
European Search Report dated Jul. 1, 2019.

*Primary Examiner* — Ronald B Abelson
(74) *Attorney, Agent, or Firm* — Cha & Reiter, LLC.

(57) ABSTRACT

A method for communication using a plurality of communication protocols and an electronic device thereof are provided. An electronic device according to various exemplary embodiments includes at least one antenna; and a control circuitry configured to perform a communication with an external electronic device by using a first protocol and a second protocol via the at least one antenna, wherein the control circuitry is configured to identify context information associated with the communication; determine, at least based on the context information, a priority associated with the first protocol and the second protocol; determine, among the first protocol and the second protocol, a protocol, based at least in part on the priority; and communicate, via the at least one antenna, using the determined protocol with the external electronic device.

18 Claims, 8 Drawing Sheets

(51) Int. Cl.
*H04L 12/24* (2006.01)
*H04W 48/18* (2009.01)
*H04W 72/10* (2009.01)
*H04W 88/10* (2009.01)
*H04W 88/06* (2009.01)
*H04L 5/00* (2006.01)

(52) U.S. Cl.
CPC ........ *H04L 41/0816* (2013.01); *H04L 67/322* (2013.01); *H04L 69/18* (2013.01); *H04W 48/18* (2013.01); *H04W 72/10* (2013.01); *H04W 88/10* (2013.01); *H04L 5/0053* (2013.01); *H04W 88/06* (2013.01)

(56) References Cited

U.S. PATENT DOCUMENTS

| | | |
|---|---|---|
| 2013/0295986 A1 | 11/2013 | Mueck |
| 2016/0249224 A1 | 8/2016 | Prasad et al. |
| 2016/0323826 A1* | 11/2016 | Xie .................. H04W 52/0251 |
| 2018/0116004 A1* | 4/2018 | Britt .................... H04W 76/027 |

* cited by examiner

METHOD FOR COMMUNICATION USING PLURALITY OF PROTOCOLS AND ELECTRONIC DEVICE THEREOF

CLAIM OF PRIORITY

This application claims priority under 35 U.S.C. § 119(a) to a Korean Patent Application entitled "METHOD FOR COMMUNICATION USING PLURALITY OF PROTOCOLS AND ELECTRONIC DEVICE THEREOF" filed in the Korean Intellectual Property Office on "Jan. 16, 2017" and assigned Serial No. "10-2017-0006928", the contents of which are herein incorporated by reference.

BACKGROUND

1. Field of the Invention

Various embodiments of the present disclosure relate to a method for communication using a plurality of communication protocols and an electronic device thereof.

2. Description of the Related Art

As portable electronic devices such as smartphones are becoming faster and more powerful, a variety of services are being provided through the electronic devices. For example, more complex services such as games, messenger services, document editing, image/video playing and editing, etc., are being added to more basic services such as telephone service, and texting, etc. As various services are provided through the electronic devices, there is a demand for functions other than simple data input/output and processing.

Additionally, the development of communication technologies has lead to the development and commercialization of a number of radio access technologies (RAT).

SUMMARY

According, this application presents an electronic device that may support various kinds of communication protocols. Additionally, certain embodiments are presented herein that may combine heterogeneous protocols, for example, a communication technique such as long term evolution unlicensed spectrum (LTE-U) or licensed-assisted access (LAA).

An electronic device according to various exemplary embodiments includes at least one antenna; and a control circuitry configured to perform a communication with an external electronic device by using a first protocol and a second protocol via the at least one antenna, wherein the control circuitry is configured to identify context information associated with the communication; determine, at least based on the context information, a priority associated with the first protocol and the second protocol; determine, among the first protocol and the second protocol, a protocol based at least in part on the priority; and communicate, via the at least one antenna, using the determined protocol with the external electronic device.

An electronic device comprising at least one antenna; and a control circuitry configured to perform a communication with an external electronic device by using a first protocol and a second protocol via the at least one antenna, wherein the control circuitry is configured to identify context information associated with the communication; determine, at least based on the context information, a priority associated with the first protocol and the second protocol; determine, among the first protocol and the second protocol, based at least in part on the priority; and communicate, via the at least one antenna, using the determined protocol with the external electronic device.

According to various exemplary embodiments of the present invention, a method of an electronic device includes identifying context information associated with a communication, determining, at least based on the context information, a priority associated with the first protocol and the second protocol, determining, among the first protocol and the second protocol, a protocol, at least based on the priority, and communicating with an external electronic device via an antenna by using the determined protocol.

DETAILED DESCRIPTION

Figure 1:
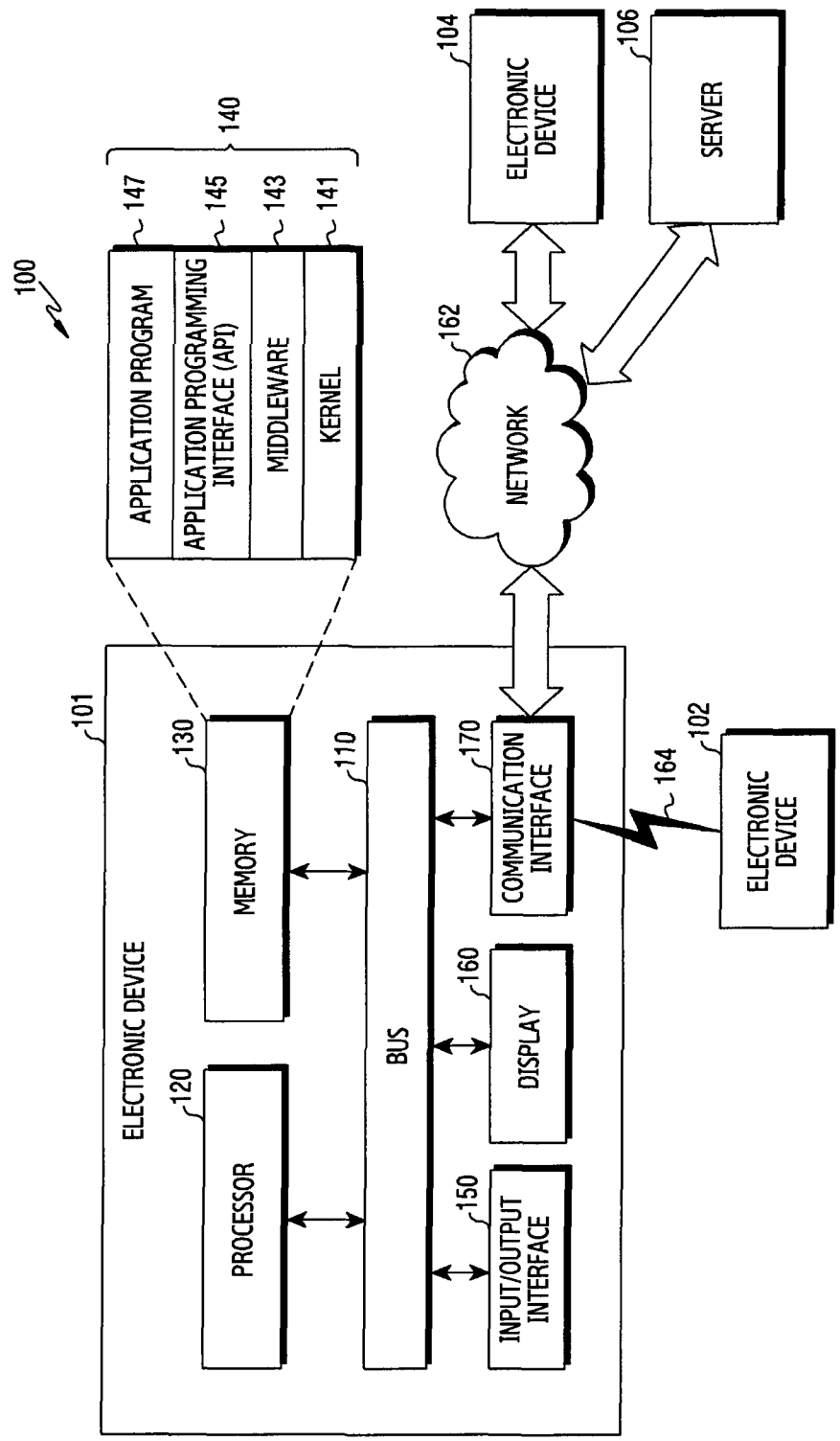
FIG. 1 illustrates an electronic device within a network environment in accordance with various embodiments of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, an electronic device 101 resides in a network environment 100. The electronic device 101 can include a bus 110, one or more processors 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The one or more processor 120 can include one or more of a CPU, an application processor, and a Communication Processor (CP). The processor 120, for example, can perform an operation or data processing with respect to control and/or communication of at least another component of the electronic device 101. In certain embodiments, the one or more processor can include a first communication processor that is configured to use a first communication protocol and a second communication processor that is configured to use a second communication protocol.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

The communication interface 170 can include a radio frequency (RF) front end and control circuitry configured to control the radio frequency front end. In certain embodiments, the RF front end can be connected to a first communication processor and a second communication processor. The RF front end control circuitry can identify context information associated with a communication, determine at least based on the context information, a priority associated with a first protocol and a second protocol, select among the first protocol and the second protocol based on the priority, and cause the RF front end to use either the first communication processor or the second communication processor. Additionally, the communication interface 170 can further include an antenna that communicates using the selected protocol.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
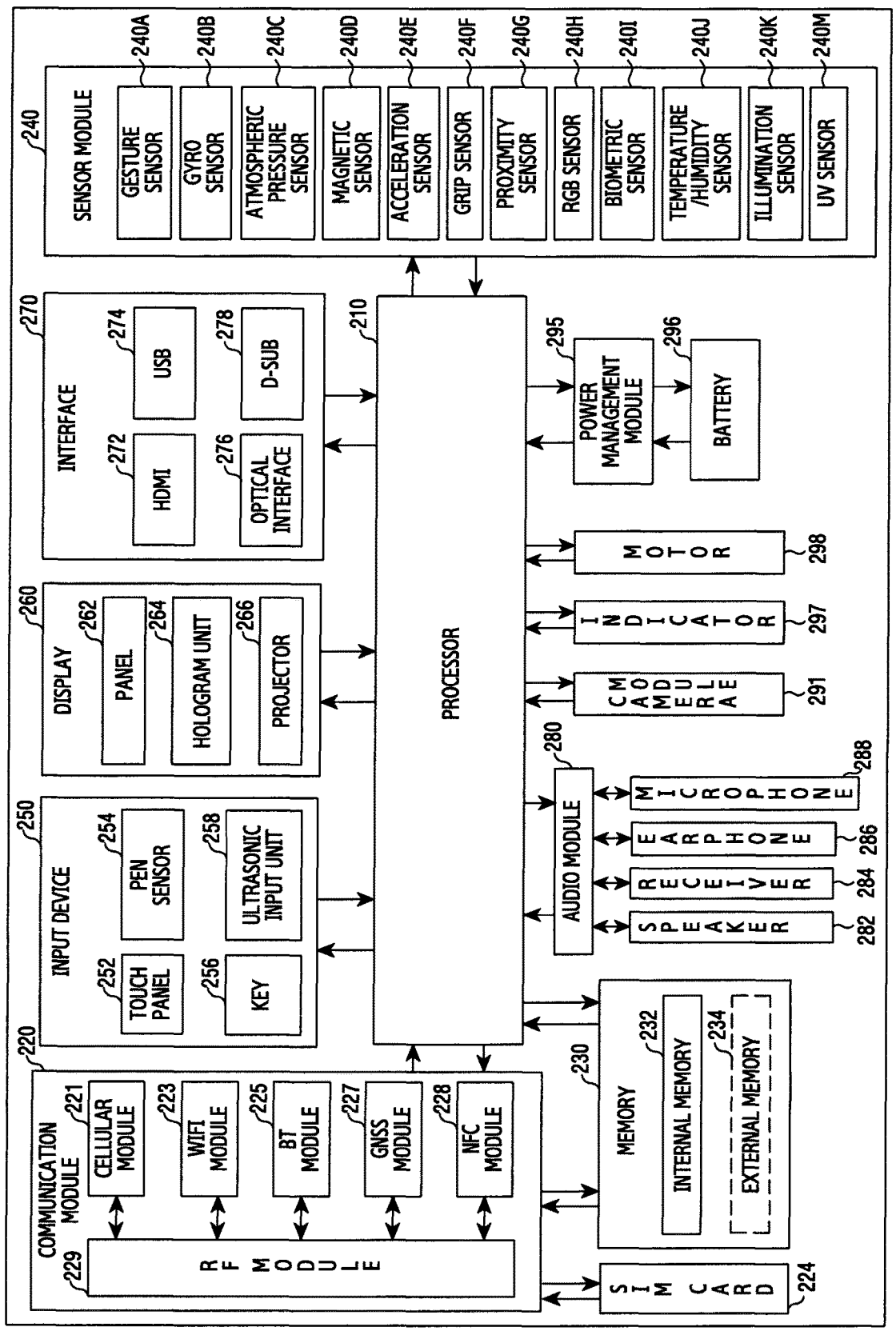
FIG. 2 illustrates a block diagram of an electronic device according to various embodiments of the present disclosure.

FIG. 2 is a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Below, various embodiments for controlling a priority between heterogeneous protocols are described with reference to FIG. 3 to FIG. 8. According to various embodiments of the present disclosure, an electronic device may support a combination between heterogeneous protocol networks. For example, the electronic device may use a combination of a band for LTE communication and a band for Wi-Fi communication, such as LTE-unlicensed spectrum (LTE-U) or licensed-assisted access (LAA). In this case, a communication processor processing an LTE signal and a communication processor processing a Wi-Fi signal may adopt a hardware structure of sharing one RF front end.

In a system sharing a RF front end, without priority control between a communication processor processing a LTE signal and a communication processor processing a Wi-Fi signal (e.g., when they are connected by an OR gate), a malfunction of communication circuitry may occur. For example, if an unknown signal is receive, a crashed state in which a LTE signal and a Wi-Fi signal are crashed mutually, or a malfunction state is discovered, the processor processing the Wi-Fi signal may determine that it is an abnormal state, and reset the processor processing the Wi-Fi signal during a constant time. Also, in Wi-Fi communication in which transmission and reception are performed in a time division duplex (TDD) technique, a time split phenomenon may occur in which a transmission time and a reception time deviate due to a handover or high-noise environment. According to various embodiments of the present disclosure, an electronic device is capable of preventing a malfunction caused by a crash between heterogeneous protocols by controlling a RF circuitry in accordance with a priority between the heterogeneous protocols.

According to various embodiments of the present disclosure, heterogeneous protocols (e.g., a first protocol and a second protocol) may provide wireless communication services of mutually different types. For example, the first protocol and the second protocol may have a least one mutually different frequency band, wireless channel, modulation/demodulation scheme, coding/decoding scheme, frame configuration, and/or a protocol stack layer. According to various embodiments of the present disclosure, priority between the first protocol and the second protocol may be set. The priority between the first protocol and the second protocol may be set according to communication performance (e.g., a data rate and/or a communication quality), a communication characteristic (e.g., a predetermined billing policy previously arranged between the user's provider and the user), or a user preference.

For example, the first protocol may be configured to have a higher priority than the second protocol. According to various embodiments of the present disclosure, when the first protocol is in a serviceable state, the electronic device may be configured to restrict communication utilizing the second communication protocol, or process data of the first protocol more preferentially than data of the second protocol.

In the following description, as an example of combination of heterogeneous networks, Wi-Fi which is a communication protocol according to the institute of electrical and electronic engineers (IEEE) 802.11 standard may be called a 'first protocol', and LTE which is a communication protocol according to the technical specification (TS) standard of 3rd generation project partnership (3GPP) may be called a 'second protocol'. However, in heterogeneous network combination according to various embodiments of the present disclosure, a communication protocol is not limited to this, and various communication protocols may be all applied when sharing a circuitry for communication. For example, a priority control technique according to various embodiments of the present disclosure may be applied not only the Wi-Fi and LTE, but also a Wibro or WiMAX communication protocol according to the IEEE 802.11 standard, a Bluetooth communication protocol, a BLE communication protocol, or between communication protocols according to the new radio (NR) standard which is called the 5th generation (5G). Additionally, in certain embodiments, LTE may be called the first protocol and the 802.11 standard may be based the second protocol.

Figure 3:
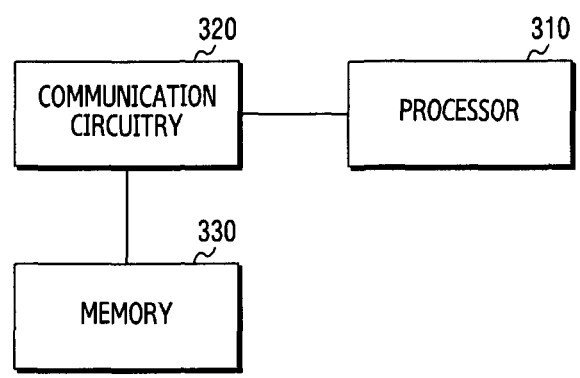
FIG. 3 illustrates an example of an operative construction of an electronic device according to various embodiments of the present disclosure.

FIG. 3 illustrates an example of an operative construction of an electronic device according to various embodiments of the present disclosure. Referring to FIG. 3, the electronic device may include a processor 310, a communication circuitry 320, and a memory 330.

The processor 310 may control a general operation of the electronic device. For example, the processor 310 may transmit or receive a signal through the communication circuitry 320. Also, the processor 310 may execute instructions stored in the memory, may record data in the memory 330, or read the data from the memory 330. The processor 310 may consist of one or more processors or microprocessors. The processor 310 may include the same or similar construction with the processor 120 of FIG. 1 or the processor 210 of FIG. 2. According to various exemplary embodiments of the present disclosure, the processor 310 of FIG. 3 may be called an application processor.

The communication circuitry 320 may perform a function for transmitting or receiving a signal. For example, the communication circuitry 320 may perform a function of conversion between a baseband signal and a bit stream in compliance with the physical layer standard of a system, such as the physical layer of the Open System Interconnection (OSI) model. The communication circuitry 320 may perform a function for wired communication or wireless communication. The communication circuitry 320 may include the same or similar construction with the communication interface 170 of FIG. 1 or the communication module 220 of FIG. 2. In various exemplary embodiments of the present disclosure, the communication circuitry 320 may be configured to support a plurality of protocols for the sake of wireless communication. For example, the communication circuitry 320 may include a control circuitry controlling a RF circuitry in accordance with a priority between protocols. According to various embodiments of the present disclosure, the communication circuitry 320 may include one or more processors which are the same as or similar with the processor 310, for the sake of wireless communication. The processor included in the communication circuitry 320 may be called a communication processor (CP).

The memory 330 may store data such as a basic program for an operation of the electronic device, an application program, setting information, etc. The memory 330 may consist of a volatile memory, a non-volatile memory, or a combination of the volatile memory and the non-volatile memory. And, the memory 330 may provide the stored data by the control of the processor 310. The memory 330 may include the same or similar construction with the memory 130 of FIG. 1 or the memory 230 of FIG. 2. In certain embodiments, the memory may store a executable instructions that cause the processor 310 to perform the operations of the method described in FIG. 4.

Figure 4:
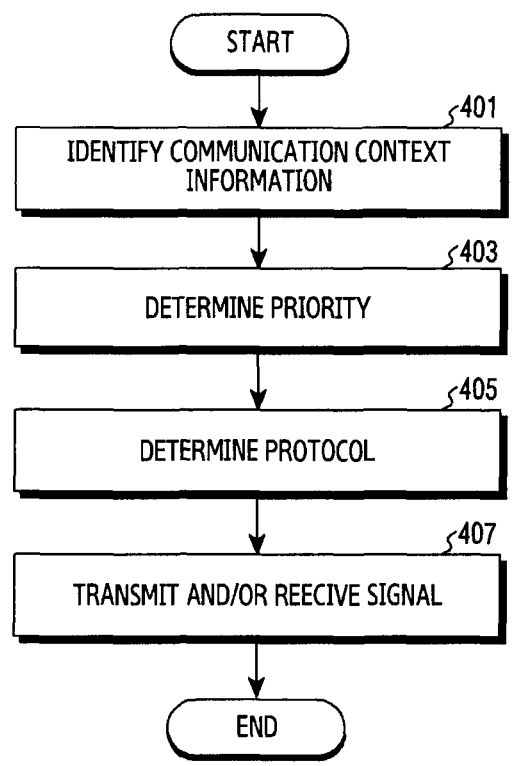
FIG. 4 illustrates a flowchart for control between heterogeneous protocols in an electronic device according to various embodiments of the present disclosure.

FIG. 4 illustrates a flowchart for control between heterogeneous protocols in an electronic device according to various embodiments of the present disclosure. The flowchart of FIG. 4 may illustrate an example of an operation process of a control circuitry included in the communication circuitry 420.

In operation 401, the communication circuitry 320 may identify context information associated with communication. In various embodiments of the present disclosure, the context information associated with the communication may be whether the first protocol (e.g., Wi-Fi) is available. For example, if the first protocol is Wi-Fi, the context information may be whether there is a Wi-Fi access point that the user has access rights to.

Also, the context information associated with the communication may confirm that signal transmission or reception is required. For example, the communication circuitry 320 may check whether it is a state in which access to a network node (e.g., an access point (AP)) providing a communication service utilizing the first protocol is available. Accordingly, in an embodiment, the communication circuitry 320 may set a priority control signal to a high state for the signal transmission or reception utilizing the first protocol.

In operation 403, the communication circuitry 320 may determine priority associated with protocols. According to various embodiments of the present disclosure, the communication circuitry 320 supporting the first protocol and the second protocol may identify a priority between the first protocol and the second protocol by identifying a priority control signal. For example, if a state of the priority control signal is high, the communication circuitry 320 may determine that the first protocol is a protocol having higher priority than the second protocol. If the state of the priority control signal is low, the communication circuitry 320 may determine that the second protocol is a protocol having a higher priority than the first protocol.

In operation 405, the communication circuitry 320 may determine a protocol among a plurality of protocols. The communication circuitry 320 may determine a RF circuitry for the first protocol among the plurality of protocols, as a RF circuitry controlling a shared RF front end for the sake of the plurality of protocols, based on a priority control signal. In various embodiments of the present disclosure, a priority control circuitry may determine a priority between protocols according to a state of the priority control signal. For example, when the priority control signal is in a first control state (e.g., a high state), a circuitry (e.g., a RF front end) processing a RF signal within the communication circuitry 320 may operate according to the first protocol. When the priority control signal is in a second control state (e.g., a low state), the circuitry processing the RF signal within the communication circuitry 320 may operate according to the second protocol.

In operation 407, the communication circuitry 320 may transmit or receive a signal by using the determined protocol. According to various embodiments of the present disclosure, a RF signal may be processed by the protocol which has been determined according to the priority of the first protocol and the second protocol and be transmitted through a wireless channel. That is, the RF front end included in the communication circuitry 320 may be controlled depending on a control signal provided from a processor for the protocol determined according to priority and accordingly to this, process a RF signal for communication based on the protocol determined according to the priority.

Figure 5:
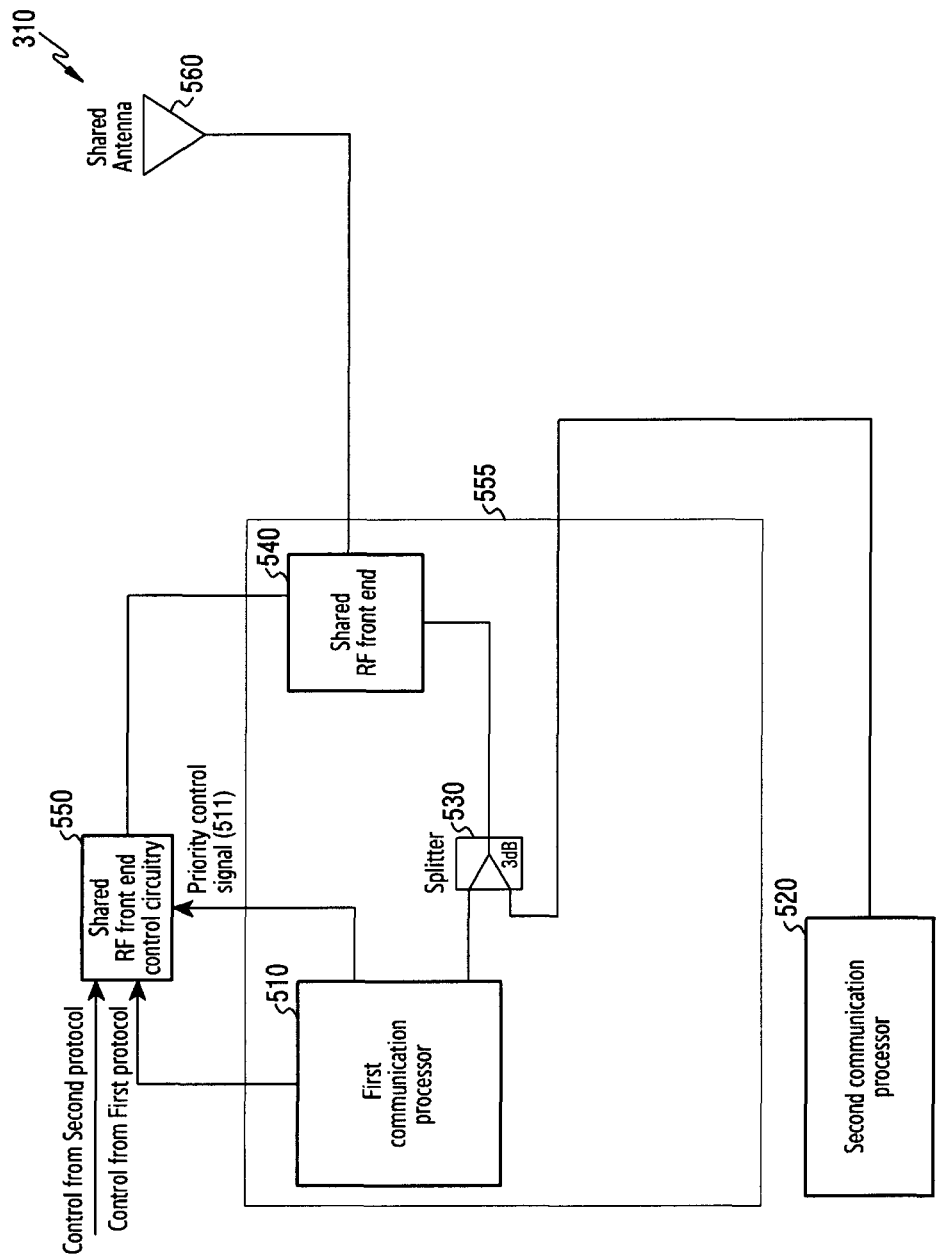
FIG. 5 illustrates an example of a communication circuitry for control between heterogeneous protocols according to various embodiments of the present disclosure.

FIG. 5 illustrates an example of a communication circuitry for control between heterogeneous protocols according to various embodiments of the present disclosure. The communication circuitry of FIG. 5 may include a first communication processor 510, a second communication processor 520, a splitter 530, a shared RF front end 540, a shared RF front end control circuitry 550, and a shared antenna 560. The communication circuitry of FIG. 5 may perform communication with an external electronic device by using a first protocol and a second protocol via at least one antenna. The communication circuitry of FIG. 5 may be called a control circuitry.

Access to the shared front end may be determined the state of a splitter 530. The splitter 530 may selectively connect the first communication processor 510 or the second communication processor 520 to the shared antenna 560 via the shared RF front end 540. The splitter 530 and the shared RF front end 540 are controlled by the shared RF front end control circuitry 550. The shared RF front end control circuitry 550 selects one of the first or second protocol based on a priority control signal 511. In certain embodiments, the first communication processor 510 is associated with a first protocol and determines, based on the context information, whether to set the first protocol as having a higher priority. The second communication processor 520 is associated with a second protocol.

The first communication processor 510 is a circuitry for signal processing utilizing a first protocol among a plurality of communication protocols. For example, the first communication processor 510 may process a signal for communicating with another electronic device by using Wi-Fi. For example, the first communication processor 510 may perform generation or conversion of data (modulation/demodulation) for the sake of signal transmission or reception utilizing the first protocol. The first communication processor 510 may include a processor for operation in each layer (e.g., a physical (PHY) layer and/or a medium access control (MAC) layer) of the first protocol, a memory, and an interface. In various embodiments of the present disclosure, the first communication processor 510 may generate a RF signal by up-converting generated data in accordance with the first protocol. The first communication processor 510 may be called a first RF system integrated circuit (IC). According to various embodiments of the present disclosure, the first communication processor 510 may identify context information associated with communication. The context information associated with the communication may include information for indicating whether signal transmission or reception associated with the first protocol occurs from another electronic device. Also, the context information associated with the communication may include information for indicating whether it is a state in which communication utilizing the first protocol is available. The first communication processor 510 may control a priority control signal 511 applied to the shared RF front end control circuitry 550, based on the context information. If the signal transmission or reception associated with the first protocol takes place, the first communication processor 510 may control the priority control signal 511 to determine the first protocol as a protocol corresponding to priority.

The second communication processor 520 is a circuitry for signal processing utilizing a second protocol among a plurality of communication protocols. For example, the second communication processor 520 may process a signal for communicating with another electronic device in compliance with the LTE standard. In various embodiments of the present disclosure, the second communication processor 520 may generate a RF signal by converting (e.g., modulating) generated data in accordance with the second protocol. Also, the second communication processor 520 may restore data by converting (e.g., demodulating) a received signal. For the sake of processing of a RF signal received from a LTE network, the second communication processor 520 may control the shared RF front end 540. The second communication processor 520 may control the shared RF front end 540 by transmitting a control signal to the shared RF front end 540. For example, the second communication processor 520 may control a reception function of the shared RF front end 540 and a low noise amplifier (LNA) path.

According to various embodiments of the present disclosure, an operation condition of LAA or LTE-U is that secondary cell addition (Scell add) is carried out at the time of a carrier aggregation (CA) operation of Band46 which is a LAA secondary cell (Scell) band. At this time, a control signal received from a LTE network may be forwarded to an input of the shared RF front end control circuitry 550. The second communication processor 520 may be called a second RF system IC.

The splitter 530 may be a circuitry of selectively connecting the first communication processor 510 or second communication processor 520 with the shared RF front end 540. The splitter 530 may forward one of a first-protocol based RF signal and a second-protocol based RF signal to the shared RF front end 540, or forward the same from the shared RF front end 540 to the first communication processor 510 or second communication processor 520. For example, the splitter 530 may be connected with the shared RF front end 540, and be configured to connect one of the first communication processor 510 and the second communication processor 530 with the shared RF front end 540. According to various embodiments of the present disclosure, the splitter 530 may be comprised of at least one switch.

The shared RF front end 540 may process a signal of a high frequency band (e.g., one gigahertz (1 GHz) or more). The shared RF front end 540 may be called a RF front end. For example, the shared RF front end 540 may generate a RF signal by converting data generated by the first communication processor 510 or the second communication processor 530, or process a signal received from the shared antenna 560. According to various embodiments of the present disclosure, the shared RF front end 540 may be shared by the first communication processor 510 and the second communication processor 520. The shared RF front end 540 may be controlled by the shared RF front end control circuitry 550. According to various embodiments of the present disclosure, the shared RF front end 540 may be positioned within the same block 555 (or RF system module) as the first communication processor 510. According to another embodiment, the shared RF front end 540 may be positioned in a block 555 (or RF system module) outside a block in which the first communication processor 610 is positioned. The block 555 including the first communication processor 510 and the shared RF front end 540 may include a port for connection with the second communication processor 520. In certain embodiments, the block 555 can be an integrated circuit and the port for the connection may be a pin on the integrated circuit.

The shared RF front end control circuitry 550 may control the shared RF front end 540. The shared RF front end control circuitry 550 may be called a RF front end control circuitry. The shared RF front end control circuitry 550 may determine a corresponding protocol among a first protocol and a second protocol, based on a priority control signal 511 applied from the first communication processor 510. The shared RF front end 540 may communicate via the shared antenna 560 by using the corresponding protocol. The shared RF front end control circuitry 550 may control the shared RF front end 540 based on a priority control signal provided from the first communication circuitry. According to various embodiments of the present disclosure, the shared RF front end control circuitry 550 may output one of a control signal of the first communication processor 510 or a control signal of the second communication processor 520, to the shared RF front end 540, in accordance with the priority control signal 511 provided from the first communication processor 510.

The RF front end control circuitry 550 may include at least one multiplexer, and the at least one multiplexer may be configured to apply a first control signal from the first communication processor 510 or a second control signal from the second communication processor 520 to the RF front end 540, based on a state of the priority control signal 511. The priority control signal 511 may be outputted from the first communication processor 510 and provided to the RF front end control circuitry 550. For example, when the state of the priority control signal 511 is a first control state (e.g., high), the shared RF front end control circuitry 550 may control the shared RF front end 540 to process a signal of the first communication processor, and disregard a signal of the second communication processor. When the state of the priority control signal 511 is a second control state (e.g., low), the shared RF front end control circuitry 550 may control the shared RF front end 540 to process the signal of the second communication processor 520, and disregard the signal of the first communication processor 510. According to various embodiments of the present disclosure, the RF front end control circuitry 550 may be implemented as a multiplexer (MUX).

The shared antenna 560 may transmit a signal processed by the shared RF front end 540 to another electronic device, or receive a signal through a wireless channel from another electronic device. The shared antenna 560 may include one or more antenna elements. The shared antenna 560 may be called at least one antenna. According to various embodiments of the present disclosure, the shared antenna 560 may be shared by the first communication processor 510 supporting the first protocol and the second communication processor 520 supporting the second protocol.

Figure 6:
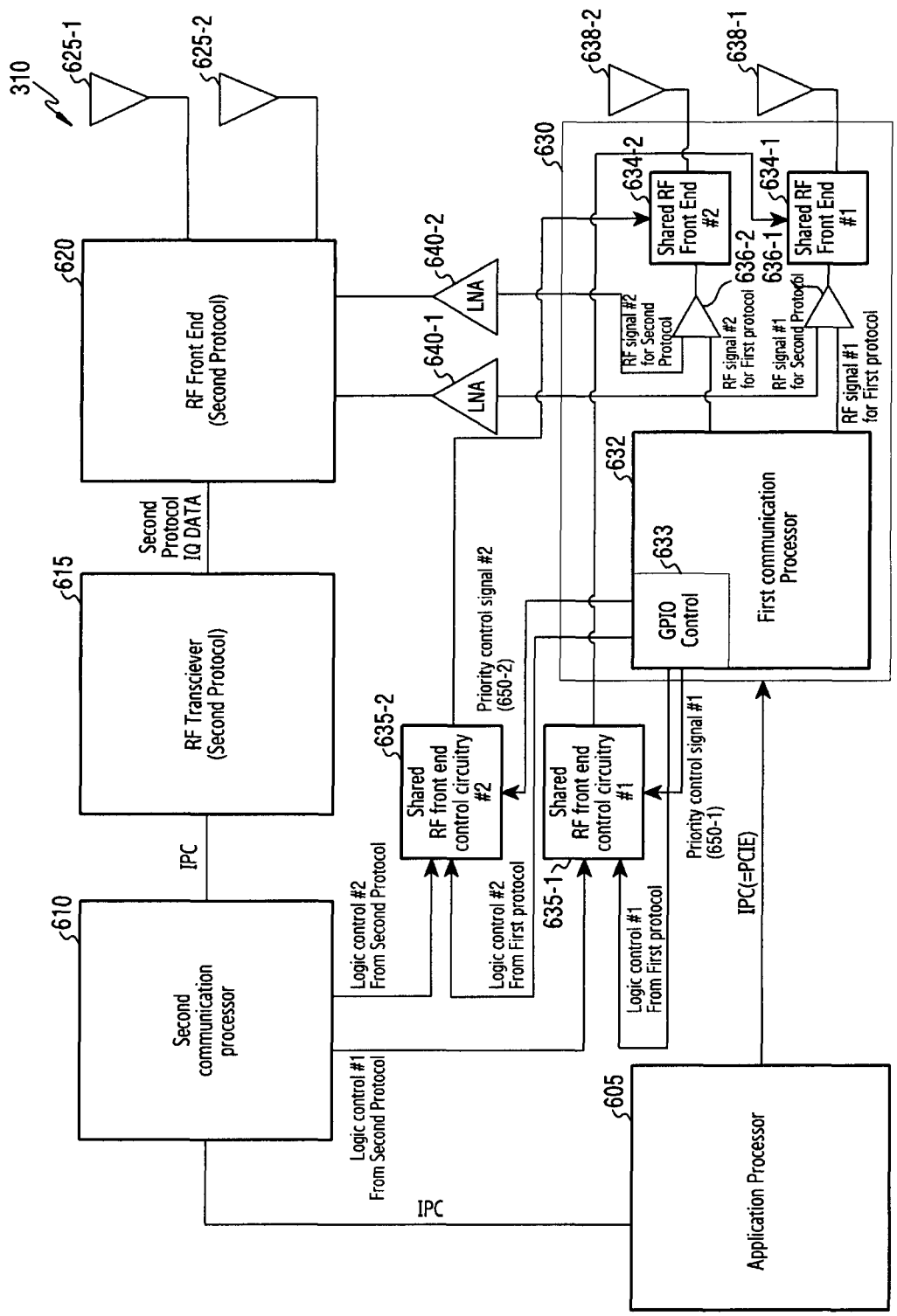
FIG. 6 illustrates another example of a communication circuitry for control between heterogeneous protocols according to various embodiments of the present disclosure.
Figure 7:
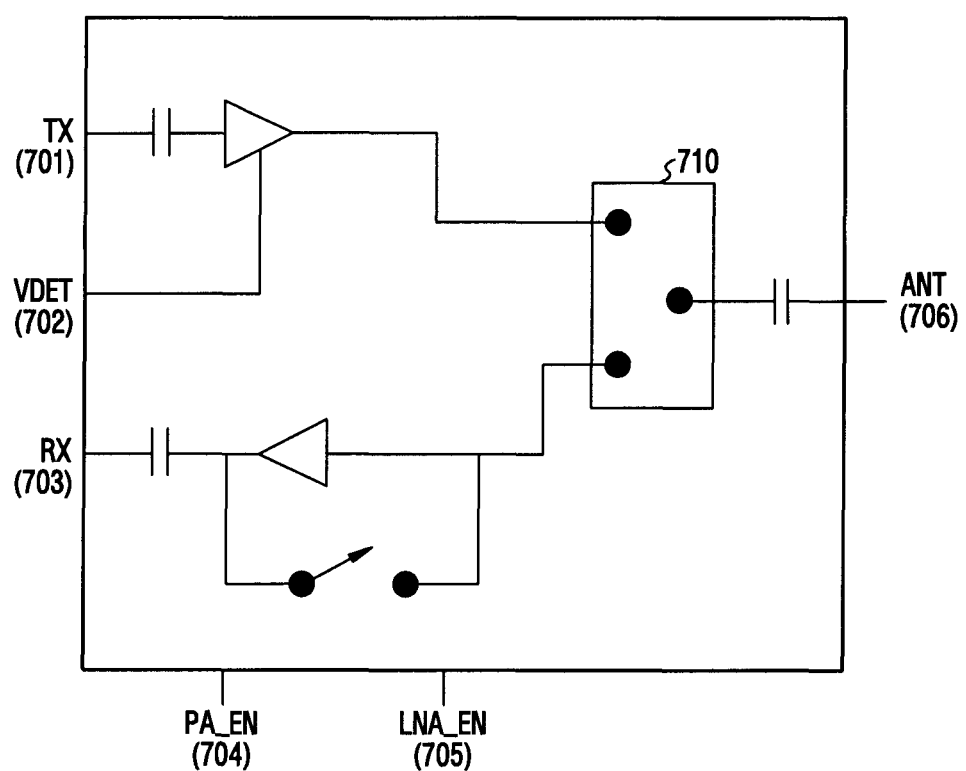
FIG. 7 illustrates an example of a radio frequency (RF) front end according to various embodiments of the present disclosure.

FIG. 6 illustrates another example of a communication circuitry for control between heterogeneous protocols according to various embodiments of the present disclosure. The communication circuitry of FIG. 6 illustrates an example of a case in which a communication processor (e.g., a first communication processor 732 or a second communication protocol 710) supporting each different protocol has been connected with an application processor 705 through inter process communication (IPC). In FIG. 7, the first communication processor 732 may be a communication module for Wi-Fi communication, and the second communication processor 710 may be a communication module for LTE communication.

Data forwarded from an application processor 705 to the second communication processor 610 or generated by the second communication processor 610 may be converted into in-phase/quadrature (I/Q) data by a RF transceiver 615. The I/Q data converted by the RF transceiver 615 may be forwarded to a RF front end 620 for a second protocol, and the RF front end 620 may convert the data into a RF signal and transmit the same to another electronic device via one or more antennas 625-1 and 625-2 for a second protocol. Also, the RF signal received via the antennas 625-1 and 625-2 for the second protocol may be down-converted by the RF front end 620 for the second protocol, and be forwarded to the RF transceiver 615 and the second communication processor 610.

According to various embodiments of the present disclosure, the second communication processor 610 may receive a signal by using a RF front end 634-1 or 634-2. The RF front end 634-1, 634-2 are shared with the first communication processor 632 that uses a different protocol from the first protocol. For example, the second communication processor 610 may control the shared RF front end 634-1 or 634-2 through a RF front end control circuitry 635-1 to 635-2. The shared RF front end 634-1 or 634-2 may receive a forward of a signal from the RF front end 620 for the second protocol and process the same. The signal from the RF front end 620 for the second protocol may be amplified through a LNA 640-1 or 640-2 and be forwarded. The second communication processor 610 of FIG. 6 shows an example of a case of receiving a RF signal through the shared RF front end 634-1 or 634-2, but the second communication processor 610 may transmit a signal by using the shared RF front end 634-1 or 634-2, and a path for signal transmission utilizing the shared RF front end 634-1 or 634-2 may be set.

According to various embodiments of the present disclosure, a block 630 for a first protocol may include the first communication processor 632, the one or more shared RF front ends 634-1 or 634-2, a splitter 636-1 or 636-2 connected between the first communication processor 632 and the shared RF front end 634-1 or 634-2, and an antenna 638-1 or 638-2 connected with the shared RF front end 634-1 or 634-2. Also, the block 630 for the first protocol may include one or more ports for connection with a RF front end for a second protocol. In certain embodiments, block 630 can include an integrated circuit, and the port can be a physical pin.

Data forwarded from the application processor 605 to the first communication processor 632 or generated by the first communication processor 632 may be forwarded to the shared RF front end 634-1 or 634-2. The shared RF front end 634-1 or 634-2 may up-convert data and transmit the same via the antenna 638-1 or 638-2. Also, a signal received by the antenna 638-1 or 638-2 may be down-converted by the shared RF front end 634-1 or 634-2 and be forwarded to the first communication processor 632. A signal received by the antenna 638-1 or 638-2 may be forwarded from the shared RF front end 634-1 or 634-2 to the RF front end 620 for the second protocol.

According to various embodiments, the shared RF front end 634-1 or 634-2 may be controlled by the RF front end control circuitry 635-1 or 635-2. For example, the RF front end control circuitry 635-1 or 635-2 may control the shared RF front end 634-1 or 634-2 in accordance with a control signal among a first control signal provided by the first communication processor 632 or a second control signal provided from the second communication processor 610. The RF front end control circuitry 635-1 or 635-2 may select a control signal among the first control signal provided from the first communication processor 632 or the second control signal provided from the second communication processor 610, based on a priority control signal 650-1 or 650-2 provided by an input/output interface (e.g., general purpose input/output (GPIO) 633) of the first communication processor 632, and output the same to the shared RF front end 634-1 or 634-2. For example, if a state of the priority control signal 650-1 or 650-2 is a first control state (e.g., high), the RF front end control circuitry 635-1 or 635-2 may select a first control signal provided from the first communication processor 632 and output the same to the shared RF front end 634-1 or 634-2. If the state of the priority control signal 650-1 or 650-2 is a second control state (e.g., low), the RF front end control circuitry 635-1 or 635-2 may select a second control signal provided from the second communication processor 610 and output the same to the shared RF front end 634-1 or 634-2. According to various embodiments of the present disclosure, the RF front end control circuitry 635-1 or 635-2 may be implemented as a multiplexer (MUX).

According to various embodiments of the present disclosure, the RF front end control circuitry 635-1 or 635-2 may be operated as in Table 1 below.

TABLE 1

| Input (Logic control) | | | |
|---|---|---|---|
| S (priority control) | I1 (first protocol) | I0 (second protocol) | Output Y |
| L | X | L | L |
| L | X | H | H |
| H | L | X | L |
| H | H | X | H |

H = High,
L = Low,
X = "Don't Care"

In the above Table 1, the 'S' of the 'Input' may refer the priority control signal 650-1 or 650-2 provided from the first communication processor 632, the 'I1' may refer the first control signal provided from the first communication processor 632, the 'I0' may refer the second control signal provided from the second communication processor 610, and the 'Output' may refer a control output signal outputted to the shared RF front end 634-1 or 634-2.

FIG. 7 illustrates an example of a shared RF front end according to various embodiments of the present disclosure. It may be understood that FIG. 7 is an example of the shared RF front end 540 of FIG. 5 or the shared RF front end 634-1 or 634-2 of FIG. 6. The shared RF front end of FIG. 7 may include a transmit (TX) input terminal 701, a detector output voltage (VDET) terminal 702, a receive (RX) output terminal 703, a terminal (PA_EN) 704 for controlling a power amplifier (PA), a terminal (LNA_EN) 705 for controlling a LNA, and an antenna terminal (ANT). Though not illustrated, the shared RF front end of FIG. 7 may include two or more additional control terminals. Also, the shared RF front end of FIG. 7 may include a LNA voltage supply terminal, the ground, or a voltage supply terminal. According to various embodiments of the present disclosure, the shared RF front end may include an input/output terminal or pin as in Table 2 below.

TABLE 2

| Pin | Name | Description |
|---|---|---|
| 1 | ANT | antenna |
| 2 | VC1 | control pin 1 |
| 3 | VC2 | control pin 2 |
| 4 | LNA_EN | LNA supply voltage |
| 5 | RX | RF receive output |
| 6 | TX | RF transmit input |
| 7 | GND | ground |
| 8 | VCC1 | supply voltage 1 |
| 9 | VCC2 | supply voltage 2 |
| 10 | VDET | detector output voltage |

According to various embodiments of the present disclosure, a control signal of the shared RF front end control circuitry 550 of FIG. 5 or a control signal of the RF front end control circuitry 635-1 or 635-2 of FIG. 6 may be provided to the LNA_EN terminal 705, to control an operation of the shared RF front end. For example, a LNA path of a signal processing block 710 of the RF front end may be controlled according to a control signal.

According to various embodiments of the present disclosure, additional control terminals (VC1 and VC2) of the shared RF front end may be connected with the first communication processor 510 of FIG. 5 or the first communication processor 632 of FIG. 6. An operation mode of the shared RF front end may be determined according to a state of a signal applied to the additional control terminals (VC1 and VC2). For example, the shared RF front end may operate in a mode among a transmission mode or a reception mode in accordance with the signal applied to the first control terminal (VC1). Also, the shared RF front end may operate in a different operation mode in each of the transmission mode or reception mode in accordance with the signal applied to the second control terminal (VC2). For example, if a state of the control signal applied to the VC1 is 1 (high), and a state of the signal applied to the VC2 is 0 (low), the shared RF front end may amplify in both a mode for transmitting a signal and a mode (i.e., a high-linearity mode) of amplifying a signal (e.g., a WLAN signal) provided from the second communication processor to have a relatively high linearity. If the state of the control signal applied to the VC1 is 1 (high), and the state of the control signal applied to the VC2 is 1 (high), the shared RF front end 700 may amplify in both a mode for transmitting a signal and a mode (i.e., a high-efficiency mode) of efficiently amplifying a signal provided from the second communication processor by using a relatively low power. If the state of the control signal applied to the VC1 is 0 (low), and the state of the control signal applied to the VC2 is 1 (high), the shared RF front end may operate in a general mode for receiving a signal. If the state of the control signal applied to the VC1 is 0 (low), and the state of the control signal applied to the VC2 is 0 (low), the shared RF front end may operate in both a mode for receiving a signal and a bypass mode of omitting the filtering or duplexing of the received signal.

The states of the signals applied to the additional control terminals (VC1 and VC2) of the shared RF front end and corresponding operation modes may be given as in Table 3 below.

TABLE 3

| State | VC1(pin 2) | VC2 (pin 3) |
|---|---|---|
| WLAN transmit 1, high-linearity mode | 1 | 0 |
| WLAN transmit 2, high-efficiency mode | 1 | 1 |
| WLAN receive, normal | 0 | 1 |
| WLAN receive, bypass mode | 0 | 0 |

Figure 8:
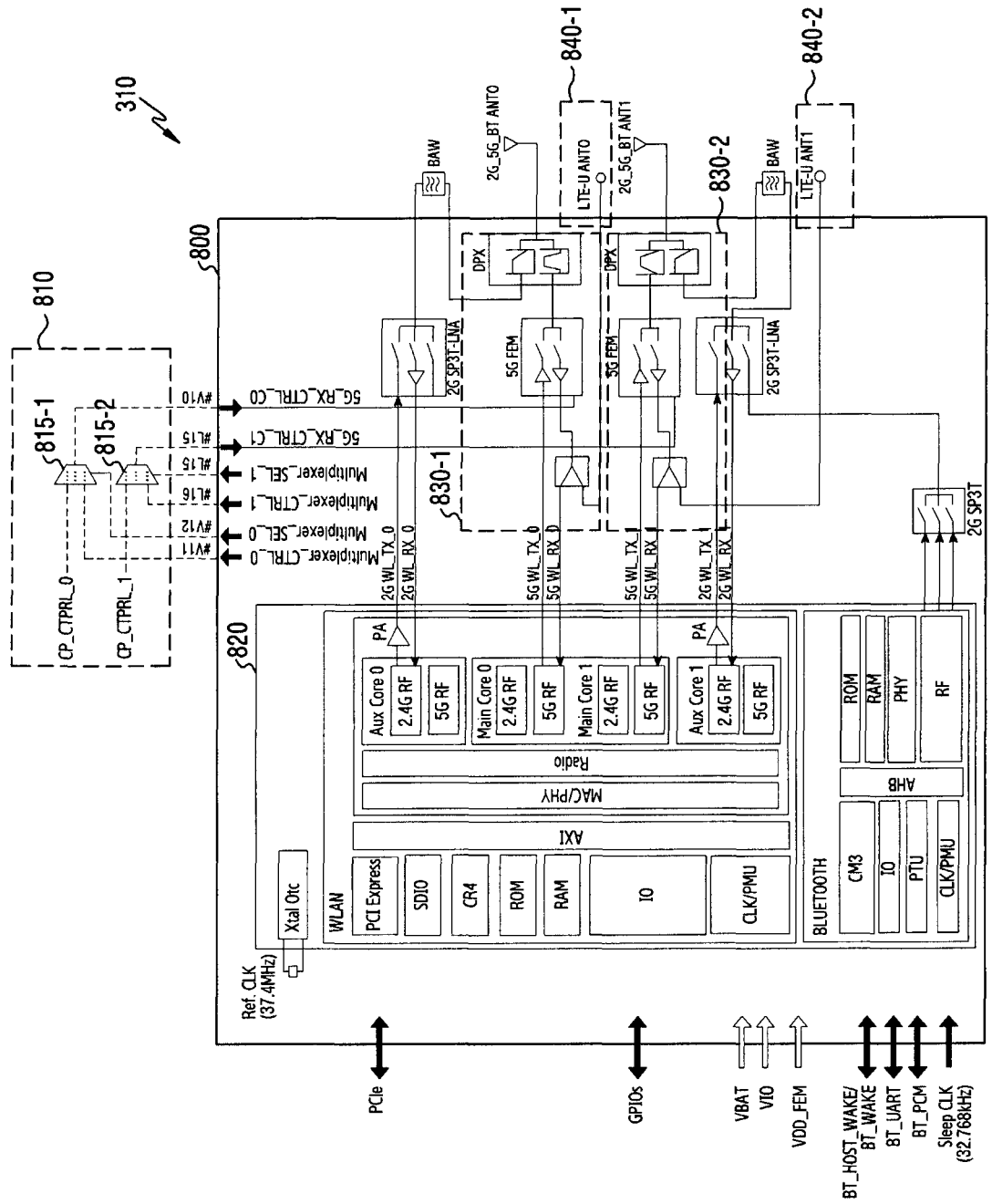
FIG. 8 illustrates another example of a communication circuitry for control between heterogeneous protocols according to various embodiments of the present disclosure.

FIG. 8 illustrates another example of a communication circuitry for control between heterogeneous protocols according to various embodiments of the present disclosure. The communication circuitry of FIG. 8 may include a RF front end control circuitry 810, a first communication processor 820 supporting a first communication protocol (e.g., Wi-Fi or Bluetooth), a shared RF front end 830-1 or 830-2, and a port 840-1 or 840-2 for connection with a second communication protocol (not shown) supporting a second communication protocol (e.g., LTE).

The RF front end control circuitry 810 may include a multiplexer 815-1 or 815-2 which outputs another control signal to the shared RF front end 830-1 or 830-2 in accordance with a priority control signal (Multiplexer_SEL_0 or Multiplexer_SEL_1) from the first communication processor 820. For example, when a state of the priority control signal (Multiplexer_SEL_0 or Multiplexer_SEL_1) is a first control state (e.g., high), the RF front end control circuitry 810 may output a control signal (Multiplexer_CTRL_0 or Multiplexer_CTRL_1) of the first communication processor 820 to the shared RF front end 830-1 or 830-2. When the state of the priority control signal (Multiplexer_SEL_0 or Multiplexer_SEL_1) is low, the RF front end control circuitry 810 may output a control signal (CP_CTRL_0 or CP_CTRL_1) of the second communication processor (not shown) to the shared RF front end 830-1 or 830-2. The RF front end control circuitry 810 of FIG. 8 may be the same or similar construction with the shared RF front end control circuitry 550 of FIG. 5 or the RF front end control circuitry 635-1 or 635-2 of FIG. 6. FIG. 8 depicts that the RF front end control circuitry 810 is positioned outside a block 800 for a first protocol, but the RF front end control circuitry 810 may be positioned inside the block 800 for the first protocol. The priority control signal (Multiplexer_SEL_0 or Multiplexer_SEL_1) may be provided to the RF front end control circuitry 810 through GPIO of the first communication processor 820.

The first communication processor 820, may be the same or similar to with the first communication processor 510 of FIG. 5 or the first communication processor 632 of FIG. 6. According to various embodiments of the present disclosure, the first communication processor 820 may support Bluetooth communication as well as Wi-Fi communication.

The shared RF front end 830-1 or 830-2, a construction for processing a RF signal, may be the same or similar to shared RF front end 540 of FIG. 5 or the shared RF front end 634-1 or 634-2 of FIG. 6. According to various embodiments of the present disclosure, the shared RF front end 830-1 or 830-2 may be connected with the RF front end control circuitry 810. The shared RF front end 830-1 or 830-2 may be configured to process a signal among a signal of a first protocol or a signal of a second protocol in accordance with a priority control signal (5G_RX_CTRL_C0 or 5G_RX_CTRL_C1) from the RF front end control circuitry 810.

The port 840-1 or 840-2 of FIG. 8 may be a port for connection of the second communication processor (e.g., communication processor for LTE) and the shared RF front end 830-1 or 830-2. The second communication processor may perform RF signal processing utilizing the shared RF front end 830-1 or 830-2 through the port 840-1 or 840-2.

According to various embodiments of the present disclosure, an electronic device supporting a heterogeneous protocol may be provided. The electronic device may include a control circuitry capable of performing a communication with an external electronic device by using a first protocol and a second protocol via at least one antenna. The control circuitry may be configured to identify context information associated with the communication, determine, at least based on the context information, a priority associated with the first protocol and the second protocol, determine, among the first protocol and the second protocol, a protocol, at least based on the priority, and communicate via the at least one antenna by using the protocol.

According to various embodiments of the present disclosure, the control circuitry may include a first communication processor configured to operate for the first protocol, a second communication processor configured to operate for the second protocol, a radio frequency (RF) front end connected to the first communication processor and the second communication processor, and a RF front end control circuitry configured to control the RF front end according to the priority between the first protocol and the second protocol.

According to various embodiments of the present disclosure, the RF front end control circuitry may be configured to control, based on a priority control signal provided from the first communication processor, the RF front end.

According to various embodiments of the present disclosure, the RF front end control circuitry may include at least one multiplexer, and the at least one multiplexer may be configured to allow, based on the priority control signal, a first control signal provided from the first communication processor or a second control signal provided from the second communication processor to the RF front end.

According to various embodiments of the present disclosure, the priority control signal may be provided from the first communication processor to the RF front end control circuitry.

According to various embodiments of the present disclosure, the control circuitry may further include a splitter, which is connected to the RF front end, configured to connect one of the first communication processor and the second communication processor with the RF front end.

According to various embodiments of the present disclosure, the first protocol or the second protocol may include at least one of long term evolution (LTE) communication protocol, wireless fidelity (Wi-Fi) communication protocol, or Bluetooth communication protocol.

According to various embodiments of the present disclosure, the context information may include information for indicating whether a transmission or a reception of a signal associated with the first protocol occurs.

According to various embodiments of the present disclosure, the control circuitry may be configured to determine, based on identifying that the transmission or the reception of the signal associated with the first protocol occurs, the first protocol as the protocol corresponding to the priority.

According to various embodiments of the present disclosure, the context information may include information for indicating whether a communication utilizing the first protocol is available.

According to various embodiments of the present disclosure, the control circuitry may be configured to determine, based on identifying that the communication utilizing the first protocol is available, the first protocol as the protocol corresponding to the priority.

According to various embodiments of the present disclosure, the RF front end may be disposed in the same RF system module as the first communication processor.

According to various embodiments of the present disclosure, the RF system module may include at least one port for connection to the second communication processor.

According to various embodiments of the present disclosure, the RF system module may be disposed in a system outside of the first communication processor.

According to various embodiments of the present disclosure, an electronic device supporting communication utilizing a heterogeneous protocol may be provided. The electronic device may include a radio frequency (RF) front end connected with at least one antenna, a first communication processor, connected to the RF front end, configured to process data associated with a first protocol, a second communication processor, connected to the RF front end, configured to process data associated with a second protocol, and a control circuitry connected to the first communication processor, the second communication processor, and the RF front end. The control circuitry may be configured to identify a priority control signal provided from the first communication processor, select, among a first control signal provided from the first communication processor and a second control signal provided from the second processor, a control signal, based on the priority control signal, and allow, to the RF front end, the selected control signal.

According to various embodiments of the present disclosure, the control circuitry may include a multiplexer, and the multiplexer may be configured to obtain the priority control signal provided via a selection line from the first communication processor, and output, to the RF front end, the control signal selected among the first control signal and the second control signal, according to the obtained priority control signal.

According to various embodiments of the present disclosure, the selection line may be connected to the first communication processor.

According to various embodiments of the present disclosure, the control circuitry may be configured to output, to the RF front end, the first control signal or the second control signal, based on the priority control signal.

According to various embodiments of the present disclosure, a method of an electronic device supporting communication utilizing a heterogeneous protocol may be provided. The method of the electronic device may include identifying context information associated with a communication, determining, at least based on the context information, a priority associated with the first protocol and the second protocol, determining, among the first protocol and the second protocol, a protocol, at least based on the priority, and communicating with an external electronic device via an antenna by using the determined protocol.

According to various embodiments of the present disclosure, the identifying of the context information may include identifying whether a communication utilizing the first protocol is available, and the determining of the priority may include determining the first protocol as a protocol with a higher priority, and the communicating via the antenna by using the determined protocol may include operating the control circuitry configured to process a RF signal of the electronic device, according to the first protocol.

According to various embodiments of the present disclosure, the method of the electronic device may further include identifying that the communication utilizing the first protocol is unavailable, and operating a control circuitry configured to process a RF signal included in the electronic device according to the second protocol.

In the aforementioned concrete embodiments of the present disclosure, constituent elements included in an electronic device have been expressed in the singular form or plural form in accordance to a proposed concrete embodiment. But, the expression of the singular form or plural form is selected suitable to proposed context for description convenience sake, and the present disclosure is not limited to singular or plural constituent elements. Despite a constituent element expressed in the plural form, the constituent element may be configured in the singular form or, despite a constituent element expressed in the singular form, the constituent element may be configured in the plural form.

While a concrete embodiment has been described in a detailed description of the present disclosure, it is undoubted that various modifications may be made without departing from the scope of the present disclosure. Therefore, the scope of the present disclosure should not be limited and defined to the described embodiment and should be defined by not only claims described later but also equivalents to these claims.

A method according to various embodiments and an electronic device thereof may prevent a malfunction caused by a crash between heterogeneous protocols, by using a priority of an operation of a communication circuitry.

What is claimed is:

1. An electronic device comprising:
   at least one antenna;
   a first communication processor configured to operate using a first protocol;
   a second communication processor configured to operate using a second protocol; and
   a control circuitry configured to perform a communication with an external electronic device by using the first protocol and the second protocol via the at least one antenna, wherein the control circuitry is configured to:
   identify context information associated with the communication;
   determine, at least based on the context information, a priority associated with the first protocol and the second protocol;
   determine, among the first protocol and the second protocol, a protocol, a priority control signal from the first communication processor, wherein if the priority control signal from the first communication is in a first control state, determining the first protocol, and wherein if the priority signal from the first communication processor is in a second control state, determining the second protocol; and
   communicate, via the at least one antenna, using the determined protocol with the external electronic device.

2. The electronic device of claim 1, wherein the control circuitry comprises:
   a radio frequency (RF) front end connected to the first communication processor and the second communication processor; and
   a RF front end control circuitry configured to control the RF front end according to the priority.

3. The electronic device of claim 2, wherein the RF front end control circuitry comprises at least one multiplexer,
   wherein the at least one multiplexer is configured to allow, based on the priority control signal, a first control signal provided from the first communication processor or a second control signal provided from the second communication processor to the RF front end.

4. The electronic device of claim 2, wherein the priority control signal is provided from the first communication processor to the RF front end control circuitry.

5. The electronic device of claim 2, wherein the control circuitry further comprises a splitter, connected to the RF front end, that is configured to connect one of the first communication processor and the second communication processor with the RF front end.

6. The electronic device of claim 1, wherein the first protocol or the second protocol comprises at least one of long term evolution (LTE) communication protocol, wireless fidelity (Wi-Fi) communication protocol, or bluetooth communication protocol.

7. The electronic device of claim 1, wherein the control circuitry is configured to determine, based on identifying that the transmission or the reception of the signal associated with the first protocol occurs, the first protocol as the protocol corresponding to the priority.

8. The electronic device of claim 1, wherein the context information comprises information for indicating whether a communication utilizing the first protocol is available.

9. The electronic device of claim 8, wherein the control circuitry is configured to determine, based on identifying that the communication utilizing the first protocol is available, the first protocol as the protocol corresponding to the priority.

10. The electronic device of claim 1, further comprising:
    an integrated circuit comprising
    the first communication processor;
    the second communication processor; and
    a radio frequency (RF) front end connected to the first communication processor and the second communication processor.

11. The electronic device of claim 10, wherein the integrated circuit comprises at least one pin connected to the second communication processor.

12. The electronic device of claim 10, wherein the RF front end is disposed outside of the first communication processor.

13. An electronic device comprising:
    a first communication processor configured to process data based on a first protocol;
    a second communication processor configured to process data based on a second protocol;
    at least one antenna;
    a radio frequency (RF) front end that is connected between the first communication processor and the at least one antenna and that is connected between the second communication processor and the at least one antenna; and
    a control circuitry, operably coupled to the RF front end, configured to:
    based on receiving a priority control signal of a first state from the first communication processor, control the RF front end such that the RF front end processes first data provided from the first communication processor to the RF front end and disregards second data provided from the second communication processor to the RF front end; and
    based on receiving the priority control signal of a second state from the first communication processor, control the RF front end such that the RF front end processes the second data and disregards the first data.

14. The electronic device of claim 13, wherein the control circuitry is implemented as a multiplexer.

15. The electronic device of claim 13, wherein the priority control signal of the first state or the priority control signal of the second signal is transmitted from the first communication processor to the control circuitry if the second communication processor operates for a licensed-assisted access (LAA).

16. The electronic device of claim 13, further comprising:
    a splitter comprising a first terminal connected with the RF front end, a second terminal connected with the first communication processor, and a third terminal connected with the second communication processor.

17. A method executed in an electronic device with a first communication processor configured to process data based on a first protocol, a second communication processor configured to process data based on a second protocol, at least one antenna, a radio frequency (RF) front end that is connected between the first communication processor and the at least one antenna and that is connected between the second communication processor and the at least one antenna, and a control circuitry operably coupled to the RF front end, the method comprising:
    based on receiving a priority control signal of a first state from the first communication processor by the control circuitry, controlling, by the control circuitry, the RF front end such that the RF front end processes first data provided from the first communication processor to the RF front end and disregards second data provided from the second communication processor to the RF front end; and based on receiving the priority control signal of a second state from the first communication processor by the control circuitry, controlling, by the control circuitry, the RF front end such that the RF front end processes the second data and disregards the first data.

18. The method of claim 17, wherein the priority control signal of the first state or the priority control of the second state is transmitted from the first communication processor to the control circuitry if the second communication processor operates for a licensed-assisted access (LAA).

* * * * *